United States Patent
Yurt et al.

(10) Patent No.: US 10,684,589 B2
(45) Date of Patent: Jun. 16, 2020

(54) APPARATUS AND METHOD FOR IN-LINE HOLOGRAPHIC IMAGING

(71) Applicant: IMEC vzw, Leuven (BE)

(72) Inventors: Abdulkadir Yurt, Heverlee (BE); Geert Vanmeerbeeck, Keerbergen (BE); Richard Stahl, Rotselaar (BE); Ziduo Lin, Heverlee (BE)

(73) Assignee: IMEC vzw, Leuven (BE)

( * ) Notice: Subject to any disclaimer, the term of this patent is extended or adjusted under 35 U.S.C. 154(b) by 210 days.

(21) Appl. No.: 15/847,521

(22) Filed: Dec. 19, 2017

(65) Prior Publication Data
US 2018/0181062 A1 Jun. 28, 2018

(30) Foreign Application Priority Data

Dec. 21, 2016 (EP) .................................. 16205862

(51) Int. Cl.
*G03H 1/02* (2006.01)
*G03H 1/00* (2006.01)
(Continued)

(52) U.S. Cl.
CPC ............. *G03H 1/02* (2013.01); *G03H 1/0005* (2013.01); *G03H 1/0404* (2013.01); *G03H 1/12* (2013.01);
(Continued)

(58) Field of Classification Search
None
See application file for complete search history.

(56) References Cited

U.S. PATENT DOCUMENTS

2012/0223217 A1   9/2012   Zheng et al.
2013/0280752 A1*  10/2013  Ozcan ................ G01N 21/4795
                                              435/29
(Continued)

FOREIGN PATENT DOCUMENTS

| FR | 3 029 632 A1 | 6/2016 |
| WO | WO 2015/015023 A1 | 2/2015 |
| WO | WO 2016/019324 A2 | 2/2016 |

OTHER PUBLICATIONS

Extended European Search Report in European Application No. 16205862.2, dated Jun. 29, 2017.

(Continued)

*Primary Examiner* — Derek S. Chapel
(74) *Attorney, Agent, or Firm* — Knobbe Martens Olson & Bear LLP

(57) ABSTRACT

An apparatus for in-line holographic imaging is disclosed. In one aspect, the apparatus includes at least a first light source and a second light source arranged for illuminating an object arranged in the apparatus with a light beam. The apparatus also includes an image sensor arranged to detect at least a first and a second interference pattern, wherein the first interference pattern is formed when the object is illuminated by the first light source and the second interference pattern is formed when the object is illuminated by the second light source. The first and second interference patterns are formed by diffracted light, being scattered by the object, and undiffracted light of the light beam. The at least first and second light sources are arranged at different angles in relation to the object, and possibly illuminate the object using different wavelengths.

17 Claims, 5 Drawing Sheets

(51) Int. Cl.
*G03H 1/04* (2006.01)
*G03H 1/12* (2006.01)

(52) U.S. Cl.
CPC ............... *G03H 2001/005* (2013.01); *G03H 2001/0212* (2013.01); *G03H 2001/046* (2013.01); *G03H 2001/0447* (2013.01); *G03H 2222/34* (2013.01)

(56) References Cited

U.S. PATENT DOCUMENTS

| | | | |
|---|---|---|---|
| 2015/0204773 A1* | 7/2015 | Ozcan | G01N 15/1463 382/103 |
| 2017/0168285 A1* | 6/2017 | Ozcan | G02B 21/367 |
| 2017/0220000 A1* | 8/2017 | Ozcan | G03H 1/0866 |
| 2017/0322516 A1* | 11/2017 | Hsiao | G03H 1/0866 |

OTHER PUBLICATIONS

Denis et al; Twin-imace noise reduction by phase retrieval in in-line digital holography; Wavelets XI, SPIE's Symposium on Optical Science and Technology, Aug. 2005.

* cited by examiner

US 10,684,589 B2

APPARATUS AND METHOD FOR IN-LINE HOLOGRAPHIC IMAGING

CROSS-REFERENCE TO RELATED APPLICATIONS

This application claims foreign priority to European Patent Application No. 16205862.2, filed Dec. 21, 2016, the contents of which are incorporated by reference herein in its entirety.

BACKGROUND

Technological Field

The disclosed technology relates to in-line holographic imaging and, in particular, to an apparatus and a method for in-line holographic imaging.

Description of the Related Technology

Digital holography is an emerging field which may be useful in numerous different applications for imaging and analysis of objects. Digital holography makes use of a digital image sensor, such as a charge-coupled device (CCD) or a complementary metal-oxide-semiconductor (CMOS) image sensor.

A digital hologram may be obtained through lens-free or lensless imaging, wherein no lenses are necessary in order to generate an image of an object. Thus, use of digital holography enables a cost-effective, compact and lightweight imaging method, which may be used, for example, in microscopy applications.

In in-line digital holography, a light beam providing uniform illumination of an object is used for creating an interference pattern based on object light, being scattered by the object, and reference light of the light beam passing unaffected through the object. The interference pattern may be acquired by the digital image sensor and then, the acquired interference pattern may be reconstructed in order to determine an image of the object. In-line digital holography may typically be useful in microscopy applications, wherein a sample which is mostly transparent may be imaged. Thus, a large amount of light is unaffected by the object so that an interference pattern may be formed.

In-line holography may be performed with a simple set-up and with minimal optical hardware requirements. However, when the interference pattern is to be reconstructed into an optical image of the object, a so-called twin-image problem occurs.

The twin-image problem is rooted in electromagnetic nature of light. The hologram reconstruction involves solving a complex wave equation in order to back-propagate electromagnetic waves from the acquired interference pattern to an object plane. However, the acquired interference pattern may only include information on intensity of light and hence phase information is not acquired. The loss of the phase information leads to two indistinguishable solutions in the wave equation, i.e., the twin-image problem. This implies that the reconstructed optical image of the object may include two overlaid images, one in focus and another out of focus, which leads to a degradation of image quality of the in-line holography.

In "Twin-image noise reduction by phase retrieval in in-line digital holography" by Denis et al. (Wavelets XI, SPIE's Symposium on Optical Science and Technology, Proceedings of SPIE, Volume 5914, pp. 59140J, 2005), different methods to address the twin-image problem are discussed. An approach is to use at least two holograms and perform hologram reconstruction in an iterative fashion to retrieve the phase information that is lost when the interference pattern is acquired.

International Patent Application Publication No. WO 2015/015023 and International Patent Application Publication No. WO 2016/019324 disclose different ways of recording several holograms, so as to allow for iterative phase retrieval.

However, a more robust method and a simpler set-up for reconstructing the optical image while handling the twin-image problem would be desired.

SUMMARY OF CERTAIN INVENTIVE ASPECTS

An objective of the disclosed technology is to provide improved in-line holographic imaging. It is a particular objective of the disclosed technology to provide in-line holographic imaging which may handle the twin-image problem in a robust manner. These and other objectives of the disclosed technology are described herein.

According to a first aspect, there is provided an apparatus for in-line holographic imaging, the apparatus including at least a first light source and a second light source arranged for illuminating an object arranged in the apparatus with a light beam; and an image sensor including a set of light-detecting elements for acquiring an image based on incident light on the set of light-detecting elements. The image sensor is arranged to detect at least a first and a second interference pattern, wherein the first interference pattern is formed when the object is illuminated by the first light source and the second interference pattern is formed when the object is illuminated by the second light source. The first and second interference patterns are formed by diffracted light, being scattered by the object, and undiffracted light of the light beam. The at least first and second light sources are arranged at different angles in relation to the object.

By means of providing a first and a second light source arranged at different angles in relation to the object, the first and second light source may illuminate the object such that there is a phase diversity between the acquired first and second interference patterns. This phase diversity may then be used in aiding reconstruction of an optical image of the object so as to avoid or alleviate the twin-image problem.

According to the disclosed technology, there is no need of any mechanical translation of the light sources, the object or the image sensor in order to obtain the first and second interference patterns. This implies that the apparatus may provide a high stability, speed, and reliability of the acquired holographic images. Further, the apparatus may use an inexpensive set-up as there is no need of translation stages.

The illumination may be performed sequentially by the first and the second light source such that the first interference pattern may be first acquired during illumination by the first light source and the second interference pattern may be subsequently acquired during illumination by the second light source.

The first and second light source may each be arranged to illuminate the object with a spatially coherent light beam. This implies that a correlation or predictable relationship between waves at different points in space exists, such that object light may cause an interference pattern with reference light spatially close to a point in which, for example, diffraction by the object occurs. The spatially coherent light beam may be formed, for example, by a laser source or by an incoherent light beam, for example emitted by a lightemitting diode (LED) which is passed through a narrow spatial filter, such as a pinhole.

The apparatus may include further light sources in addition to the first and second light sources in order to allow for acquiring of further interference patterns when the object is illuminated from angles different from the angles of the first and second light sources, respectively, in relation to the object. This implies that even more information related to the object may be acquired improving possibilities of retrieving the phase information.

According to an embodiment, the at least first and second light sources are mounted to have a fixed relation to the object and the image sensor.

The apparatus may thus provide a fixed optical set-up of the first and second light sources in relation to the object and the image sensor. This implies that a very accurate knowledge of the relation between the light sources and an object position may be provided, as the relation is not changed after manufacture or installation of the apparatus. This accurate knowledge may be used in the reconstruction of an image of the object such that the reconstruction may be performed with high accuracy. Further, any imprecision in mounting of the sources during manufacture may be accounted for once through an initial calibration of the apparatus. This calibration may even be performed as a last step in manufacturing of the apparatus, such that the apparatus may be delivered with a software for reconstructing optical images from acquired interference patterns, wherein the software includes calibration data on the delivery.

The fixed optical set-up in relation to the object may be provided in that the apparatus provides a well-defined position in which an object may be placed in the apparatus, such that the object is arranged in the apparatus in a specific position in relation to the light sources.

According to an embodiment, the at least first and second light sources are arranged at different azimuthal angle and polar angle with respect to a center of the object. Thus, the light sources may be arranged at angles which differ in relation to the object in two respects in a three-dimensional space.

In a spherical coordinate system, a center of the object may be placed at the origin of the coordinate system. The object may have a planar surface, defining an object plane and a normal to the object plane. A position of each of the light sources may then be defined by a radial distance along a straight line from origin to the position of the light source, a polar angle measured from the normal to the straight line from origin to the position of the light source, and an azimuthal angle measured from a fixed reference direction in the object plane to an orthogonal projection of the position of the light source to the object plane.

According to an embodiment, the first and second light sources are arranged in relation to the object and the image sensor such that the angles of the first and second light sources in relation to the object differ to such an extent that the second interference pattern is shifted at least a distance corresponding to a size of a light-detecting element of the image sensor in relation to the first interference pattern. This implies that the angular displacement of the light sources is so large that the interference patterns are shifted in relation to each other at pixel level of the image sensor. Hence, the interference patterns may include different information based on phase diversity which allows reconstructing the image of the object while removing the twin-image problem.

A large shift of the interference pattern may be advantageous over a small shift in order to obtain a high quality reconstructed image, as a large shift may facilitate extraction of the phase information from the acquired interference patterns. However, a large shift may also imply that an overlap in a field of view of the object is decreased such that a smaller area of the object may be included in the reconstructed image of the object from the acquired interference patterns.

According to an embodiment, the at least first and second light sources are arranged at substantially equal radial distances from a center of the object. This may provide for a relatively simple set-up with the light sources arranged on a common support. Also, having the light sources at substantially equal radial distances implies that an analysis of the interference patterns in reconstruction of the image of the object may be relatively simple as the relative distance between the image sensor and the object in relation to the distance between the object and the light source is similar, which implies that a magnification of the object as imaged in the interference pattern is similar. However, it should be realized that a difference in radial distance may be handled by calibration when setting up the apparatus or a software for processing interference patterns acquired by the apparatus.

According to an embodiment, each of the at least first and second light sources is arranged to illuminate the object with a unique wavelength. The difference in wavelengths also enables further phase diverse information to be acquired in the interference patterns.

Although the interference patterns may be acquired in a sequential manner, using different wavelengths also enables simultaneously acquiring the first and the second interference patterns. The use of different wavelengths makes it possible to differentiate between the first interference pattern and the second interference pattern in the image sensor. For instance, the image sensor may include an intertwined layout of different wavelength filters on the light-detecting elements such that a two-dimensional interference pattern may be acquired for each wavelength interval defined by the different wavelength filters. However, it should be realized that a resolution of the acquired interference patterns is reduced if several different wavelength filters are arranged on the image sensor. Thus, it may still be desired to use a sequential illumination while using different wavelengths of the light sources.

According to an embodiment, the unique wavelengths are chosen in relation to the object to provide an achromatic response of the object. When the object provides an achromatic response for the unique wavelengths, the interference patterns may be effectively used in conjunction with each other. The acquired interference patterns are thus not strongly wavelength dependent. The interference pattern due to diffraction or scattering by the object may still be different for different wavelengths due to a different effective distance of the object from the image sensor based on a difference in wavelengths. However, this difference may be accounted for when reconstructing an image of the object, since the wavelength may be used in forming the reconstructed image.

According to an embodiment, the at least first and second light sources are laser diodes arranged in a conventional package.

The arrangement of the light sources in a conventional package may allow the apparatus to make use of a common manner of providing laser light sources, such that an inexpensive off-the-shelf product may be used and mounted in the apparatus.

According to an embodiment, the at least first and second light sources include lightguides formed in a common photonic integrated circuit defining different light outputs for the different light sources.

A photonic integrated circuit may be created with an accurate control of shapes of the integrated circuit. Thus, the lightguides may be well-defined and provide good control of a position of output for the light sources. Further, the photonic integrated circuit may define the light output for all light sources, such that the position of the light sources in relation to the object may be well controlled by a single photonic integrated circuit.

The light sources may be integrated in the photonic integrated circuit for providing the light generation and light output in a single, small component. However, light generation may alternatively be provided in a component different from the photonic integrated circuit such that the light is first coupled into the lightguides before being output at the light outputs of the photonic integrated circuit for defining the light sources.

According to an embodiment, the apparatus further includes a receiver arranged to receive a sample holder carrying the object, wherein the receiver defines a position of the object in relation to the at least first and second light sources and the image sensor. The receiver may thus provide a well-defined position of the object, such that a user may place the sample holder in the receiver when an object is to be imaged.

In a particular embodiment, the sample holder may have standardized measures and the receiver may include a structure adapted to received such a standardized sample holder and arrange it in a well-defined relation to the light sources. For instance, the sample holder may be a substrate including a microfluidic channel, for example, for carrying a sample of a body fluid. Alternatively, the sample holder may be a substrate including a thin film containing structural formations to be investigated.

According to an embodiment, the apparatus further includes a processing unit configured to process the detected at least first and second interference patterns according to an iterative phase recovery algorithm for forming a reconstructed image of the object.

The apparatus may thus include a processing unit for forming a reconstructed image in addition to hardware components for acquiring the interference patterns on which the reconstructed image is based. The processing unit may thus be arranged in a common housing with other hardware components, such that a compact apparatus may be provided.

In an alternative, the acquired interference patterns may be transmitted to an external unit, which may be arranged to process the interference patterns for forming the reconstructed image of the object.

According to a second aspect, there is provided a method for in-line holographic imaging, the method including: acquiring a first image of a first interference pattern, wherein the first interference pattern is formed when an object is illuminated by a light beam of a first light source, wherein the first interference pattern is formed by diffracted light, being scattered by the object, and undiffracted light of the light beam. The method also includes acquiring a second image of a second interference pattern, wherein the second interference pattern is formed when the object is illuminated by a light beam of a second light source, wherein the second interference pattern is formed by diffracted light, being scattered by the object, and undiffracted light of the light beam. The second light source is arranged at a different angle to the object than the first light source. The method further includes processing the first image and the second image to perform iterative phase retrieval using information of the relation between the first and second light source to the object, wherein the processing forms a reconstructed image of the object with an estimation of phase information.

Effects and features of this second aspect are largely analogous to those described above in connection with the first aspect. Embodiments mentioned in relation to the first aspect are largely compatible with the second aspect.

By means of the first and second interference patterns being formed based on a first and a second light source arranged at different angles in relation to the object, a phase diversity is present between the acquired first and second interference patterns. This phase diversity may then be used in aiding reconstruction of an optical image of the object so as to estimate phase information and break the degeneracy of the twin images such that effect of the image out of focus is reduced.

The first and second image of the first and second interference patterns may be acquired sequentially, by first illuminating the object by the light beam of the first light source and subsequently illuminating the object by the light beam of the second light source. However, it should be realized that the first and second image may be simultaneously acquired by subsets of light-detecting elements of the image sensor, for example being sensitive to different wavelengths of the first and second light sources.

According to an embodiment, an iteration of the iterative phase retrieval includes calculating back-propagation of a light wave from an image plane to an object plane using characteristics of the first light source to form a first reconstructed image of the object and, based on the first reconstructed image, calculating forward-propagation of a light wave from the object plane to the image plane using characteristics of the second light source.

This implies that the information relating to the different set-ups of the first and second light sources in relation to the object may be used in an iteration so as to enable phase retrieval from the phase diversity provided by the first and second interference patterns.

Further, the forward-propagated light wave to the image plane using characteristics of the second light source may form a hologram representation corresponding to the second image of the second interference pattern. The phase information of this hologram representation may then be maintained while an intensity is replaced by the intensity acquired in the second image. This implies that the reconstruction of the phase information may be improved when iterating the back-propagation and forward-propagation.

According to an embodiment, the iterative phase retrieval is performed using information obtained during an initial system calibration. Since the set-up of the light sources to the object and the image sensor may be fixed, knowledge of these relations may be obtained during an initial system calibration. Thus, the reconstruction of the image may be based on a very accurate knowledge of conditions in which the first and second images were acquired.

According to an embodiment, the first image and the second image are acquired using illumination of different wavelengths.

Further, using different wavelengths of the light sources, the first image and the second image may according to an embodiment be acquired simultaneously. This may be especially advantageous if the object is moving or changing (for example, if cells moving within a fluidic sample are imaged) such that blur caused by changes to the object or a position of the object between the first and second images may be avoided.

BRIEF DESCRIPTION OF THE DRAWINGS

The above, as well as additional objects, features and advantages of the disclosed technology, will be better understood through the following illustrative and non-limiting detailed description of embodiments of the disclosed technology, with reference to the appended drawings. In the drawings like reference numerals will be used for like elements unless stated otherwise.

DETAILED DESCRIPTION OF CERTAIN ILLUSTRATIVE EMBODIMENTS

Detailed embodiments of the disclosed technology will now be described with reference to the drawings.

Figure 1A:
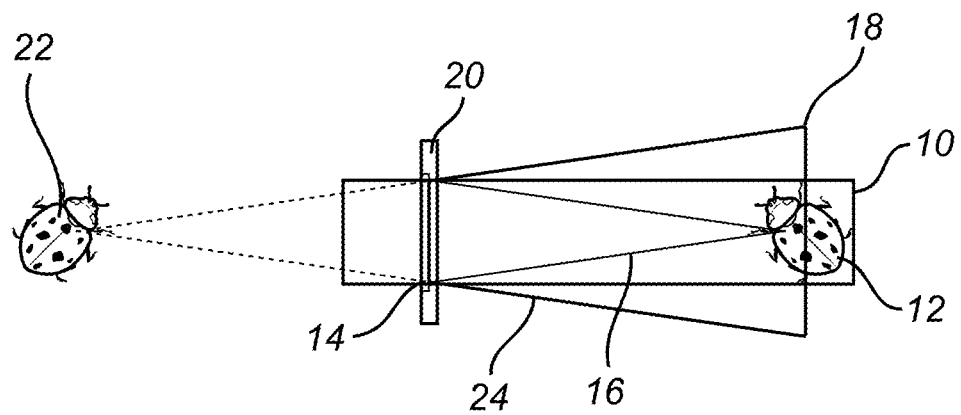
FIG. 1A is a schematic illustration of a twin image problem in in-line holographic imaging.

The disclosed technology relates to in-line digital holographic imaging. As illustrated in FIG. 1A, in in-line holographic imaging, object light and reference light have a common optical axis and is formed from a common illumination beam 10. Thus, an object 12 is illuminated by the illumination beam 10 which is partly diffracted by the object 12 forming the object light and partly is unaffected by the object 12 forming the reference light. The object light and the reference light may thus form an interference pattern, which may be acquired by an image sensor 14. As illustrated by ray 16, the diffraction of object light is distributed onto the image sensor 14.

The image sensor 14 detects a two-dimensional distribution of light intensity as a representation of the interference pattern. An image of the object 12 may then be reconstructed by applying a complex wave equation to the detected interference pattern for forming a focused image in an object plane 18 from the detected light in an image plane 20 in which the image sensor 14 is arranged.

Figure 1B:
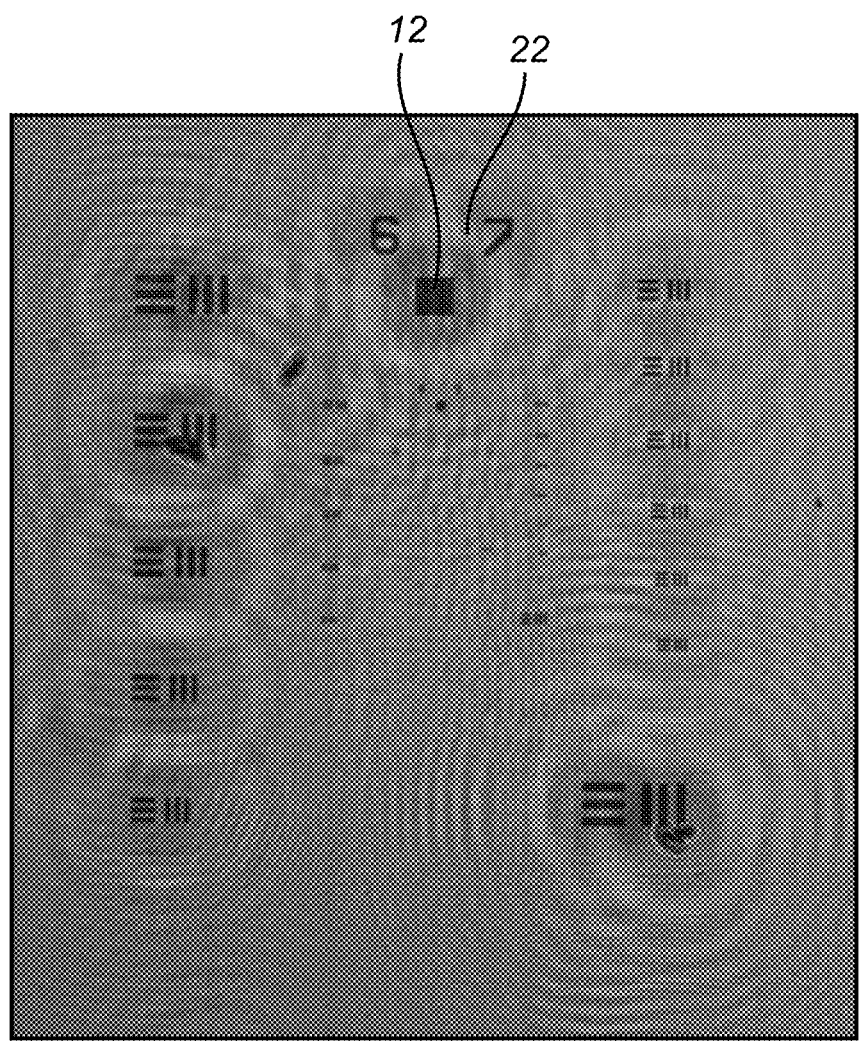
FIG. 1B is an example reconstructed image of an object illustrating the twin image problem.

However, the detected light intensity does not include phase information and the detected interference pattern could also have been formed by a virtual twin image 22 of the object 12. Thus, when the complex wave equation is solved for reconstructing the image of the object 12 by back-propagating the detected interference pattern in the image plane 20 to form the image of the object 12 in the object plane 18, a contribution of the virtual twin image 22 cannot be removed. In the reconstructed image of the object 12, the twin image 22 of the object will also be imaged, but the twin image 22 will be out of focus in the object plane 18 as illustrated by ray 24. The twin image 22 will thus affect quality of the reconstructed image. As illustrated in FIG. 1B, which is a reconstructed image of a test object, a defocussed twin image 22 appears as halos around sharp features forming the object 12.

Figure 2:
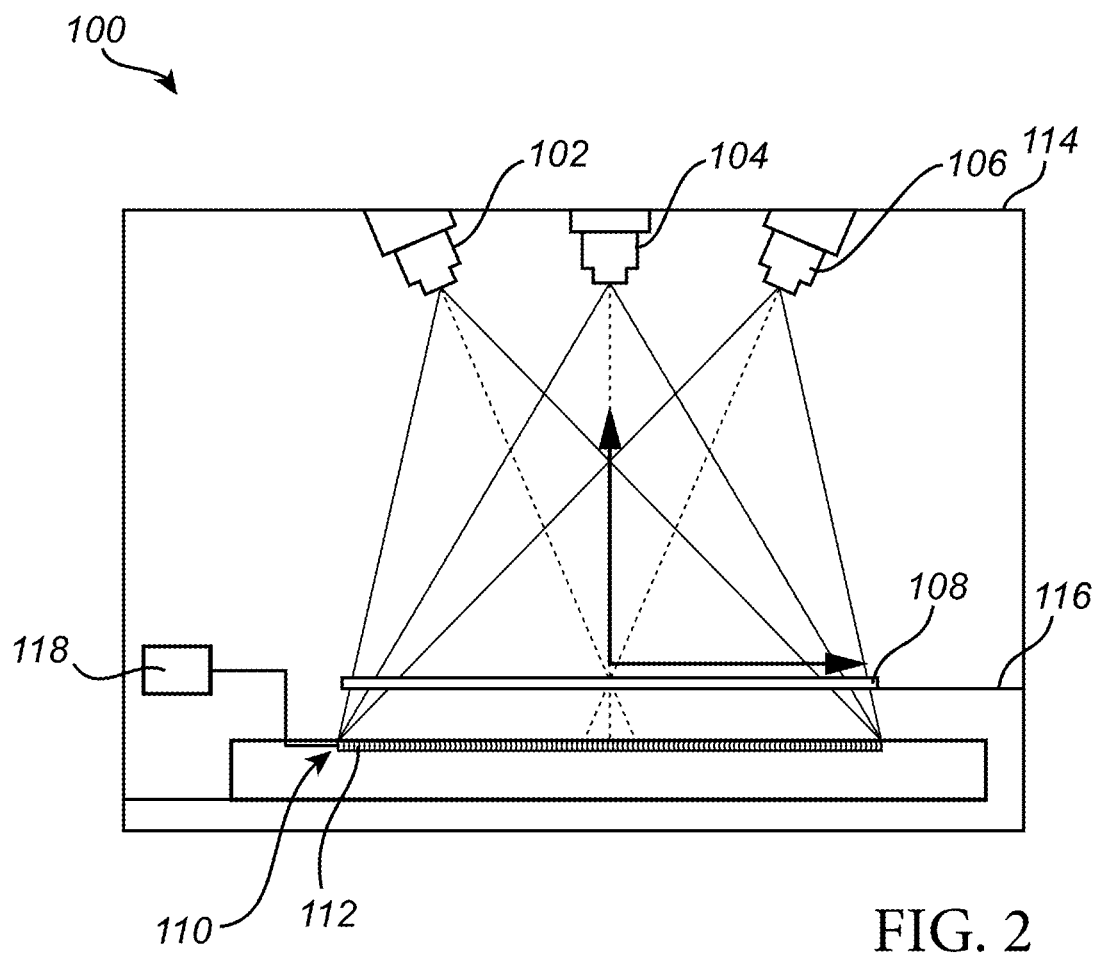
FIG. 2 is a schematic view of an apparatus according to an embodiment.

Referring now to FIG. 2, an apparatus 100 according to an embodiment of the disclosed technology will be described. The apparatus 100 is arranged in order to acquire image information using in-line holographic imaging in such a manner as to enable alleviating the twin image problem described above.

As illustrated in FIG. 2, the apparatus 100 includes three light sources 102, 104, 106. The apparatus 100 may include more than three light sources, such as four, five or even more light sources. However, the apparatus 100 will at least include two different light sources.

Each of the light sources 102, 104, 106 is arranged to illuminate an object 108, when the object 108 is arranged in the apparatus 100. The light sources 102, 104, 106 are arranged at different angles in relation to the object 108 and may thus illuminate the object 108 in different manners such that information recorded during the different illuminations provides phase diversity information.

The apparatus 100 further includes an image sensor 110, which includes a set of light-detecting elements 112. The light-detecting elements 112 may thus detect a light intensity incident on the respective light-detecting element 112 and together the set of light-detecting elements 112 may detect a distribution of light intensities in two dimensions in a plane defined by the image sensor 110. Thus, when the object 108 is illuminated by a light beam from at least one of the light sources 102, 104, 106, an interference pattern formed by diffracted light, being scattered by the object 108, and undiffracted light of the light beam may be acquired by the image sensor 110.

The image sensor 110 could include various types of arrays of light-detecting elements 112 for detecting intensity of incident light. For instance, the image sensor 110 could include an array of charge-coupled device (CCD) pixels or an array of complementary metal-oxide-semiconductor (CMOS) pixels. The image sensor 110 could further include circuitry for reading out information on light intensities detected in the light-detecting elements 112 and for performing analog-to-digital conversion for creating a digital representation of the interference pattern.

The arrangement of the light sources 102, 104, 106 at different angles in relation to the object 108 allows the apparatus 100 to acquire a multiple wave-vector combination in the form of a plurality of acquired intereference patterns. The apparatus 100 may provide a fixed relation between each of the light sources 102, 104, 106, the object 108 and the image sensor 110. This implies that knowledge of the fixed relation may also be used in extracting phase information and, hence, in reconstructing an image of the object 108 of high quality.

The apparatus 100 may include a housing 114 in which the image sensor 110 and the light sources 102, 104, 106 are mounted. The housing 114 may thus provide mounting supports for the image sensor 110 and for the light sources 102, 104, 106, which defines relations between the image sensor 110 and the light sources 102, 104, 106 in a well controlled manner.

The housing 114 may also include a receiver 116 for receiving an object 108 to a well-defined position in the housing 114. The receiver 116 could be movable between a measurement position in which the object 108 received in the receiver 116 is presented for illumination by the light sources 102, 104, 106 and a mounting position, extending at least partly outside the housing 114 allowing a user to place the object 108 in the receiver 116. The receiver 116 may be arranged to perform a simple movement, for example a pure rotation or translation, between the measurement position and the mounting position, such that a position of the object 108 is accurately defined in the housing 114. Alternatively, the receiver 116 may be fixed and the housing 114 may allow access to a user for placing an object 108 in the receiver 116.

The receiver 116 may have any shape or form for supporting or receiving the object 108 in the measurement position. In one embodiment, the object 108 may be arranged in a sample holder having standardized size and shape and the receiver 116 may include a slot for receiving the sample holder in a pre-defined relation in the receiver 116. In another embodiment, the receiver 116 may include one or more supporting structures on which the object 108 may be placed in the housing 114.

The apparatus 100 may thus be arranged for acquiring interference patterns by illuminating the object 108 under well-known conditions. As described in detail below, the acquired interference patterns may be processed using information of placement of the respective light sources 102, 104, 106 in relation to the object 108 and the image sensor 110. The acquired interference patterns may be processed in an iterative manner in order to retrieve phase information and remove twin image noise. Any imprecision in placement of light sources 102, 104, 106, object 108 and the image sensor 110 in the housing and/or imprecision in wavelength(s) emitted by the light sources 102, 104, 106 may be accounted for by initial calibration of the apparatus 100. As the apparatus 100 provides a fixed set-up, the initial calibration may then be used throughout imaging of objects 108 with the apparatus 100.

The light sources 102, 104, 106 may be arranged at different angles with relation to the object 108 in at least one respect in a three-dimensional space. However, the light sources 102, 104, 106 may be arranged at different angles with relation to the object 108 in two respects in a three-dimensional space. In a spherical coordinate system, the light sources 102, 104, 106 may be arranged at different azimuthal angles and polar angles with respect to a center of the object 108.

Figure 3:
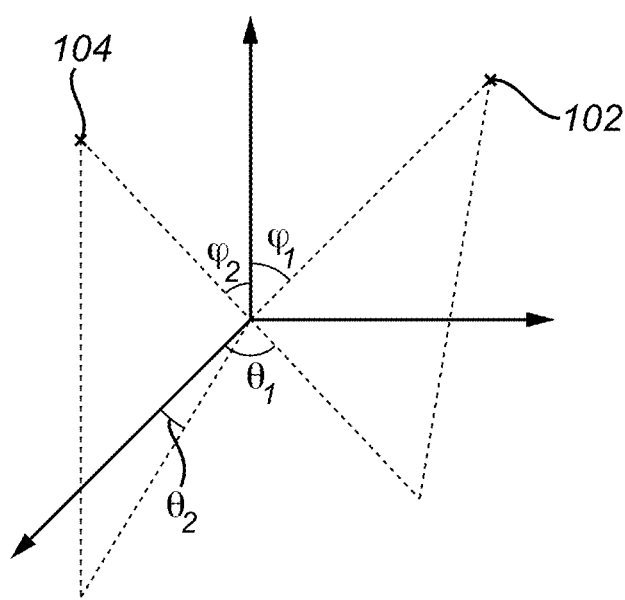
FIG. 3 is a schematic view illustrating angular displacement of light sources in the apparatus.

As illustrated in FIG. 3, the first light source 102 may be arranged at a first azimuthal angle $\theta 1$ and a first polar angle $\varphi 1$ in relation to the object 108, whereas the second light source 104 may be arranged at a second azimuthal angle $\theta 2$ and a second polar angle $\varphi 2$ in relation to the object 108.

The light sources 102, 104, 106 are arranged in relation to the object 108 and the image sensor 110 such that the arrangement of the light sources 102, 104, 106 in relation to the object differ to such an extent that the interference patterns in the image plane defined by the image sensor 110 are shifted at least a distance corresponding to a size of a light-detecting element 112 in relation to each other. Thus, if the apparatus 100 is designed with a relatively large distance from the object 108 to the light sources 102, 104, 106, the light sources 102, 104, 106 may need to be arranged relatively far apart. The larger angular displacement of the light sources 102, 104, 106, the more diverse information may be acquired in the acquired interference patterns facilitating fast reconstruction of an image of the object 108 and obtaining an image of high quality.

However, in reconstruction of the image of the object 108 only a shared field of view of the object 108 may be used in iterative phase retrieval. Thus, if the angular displacement of the light sources 102, 104, 106 is large, the shared field of view may be relatively small with edges of the acquired interference patterns not being from commonly imaged parts of the object 108. This implies that a field of view of the reconstructed image may be reduced. The shared field of view may be increased by decreasing a distance between the object 108 and the image sensor 110, increasing a distance between the object 108 and the light sources 102, 104, 106, or decreasing a distance between the light sources 102, 104, 106.

The angular displacement of the light sources 102, 104, 106 should thus take into account the field of view possible to be reconstructed with high quality in the reconstructed image of the object and the possibility to acquire diverse information for removing the twin image noise. In an embodiment, the angular displacement of the light sources 102, 104, 106 may be designed to be of such extent that the interference patterns acquired in the image sensor 110 are shifted a distance corresponding to 10-20 pixels.

Each of the light sources 102, 104, 106 may be arranged to emit spatially coherent light such that forming of an interference pattern in interaction with the object 108 is enabled. The light sources 102, 104, 106 may thus include laser sources, for example, in the form of laser diodes. According to an alternative, the light sources 102, 104, 106 may include a combination of a source generating incoherent light and a spatial filter, for example a pinhole for forming spatially coherent light when the light passes the spatial filter. It should be realized that the light sources 102, 104, 106 may all be formed by similar types of sources or may be formed by different types of sources.

The light sources 102, 104, 106 may be arranged to emit the same wavelengths and may thus be identical light sources 102, 104, 106. In such case, the light sources 102, 104, 106 may be arranged to sequentially illuminate the object 108 such that a separate interference pattern may be acquired by the image sensor 110 under each illumination of the object 108. The image sensor 110 may thus include monochromatic light-detecting elements 112. The object 108 may be assumed to be stationary and invariable during acquiring of the plurality of interference patterns.

Alternatively, the light sources 102, 104, 106 may be arranged to emit light of different wavelengths. The use of different wavelengths further adds to acquiring of diverse phase information such that a reconstructed image of high quality may be obtained.

The light sources 102, 104, 106 may be chosen in relation to objects 108 that are to be imaged by the apparatus 100 such that the object 108 is achromatic in relation to the emitted wavelengths. The light sources 102, 104, 106 may thus be arranged to emit wavelengths for which objects 108 to be imaged may typically have an achromatic response. The apparatus 100 may be used for imaging of similar objects 108 so that characteristics of the object 108 may be known and the light sources 102, 104, 106 may be chosen accordingly.

The object 108 should thus not exhibit strong wavelength dependent scattering or absorbance characteristics (such as resonances) across a spectral range spanning emission wavelength range of the light sources 102, 104, 106.

When the light sources 102, 104, 106 are arranged to emit different wavelengths, several interference patterns may be acquired simultaneously by different light-detecting elements 112 in the image sensor 110 being arranged to detect light of different wavelengths. Each light-detecting element 112 may thus be arranged to detect the wavelength emitted by one of the light sources 102, 104, 106, for example by having a corresponding filter arranged integrated on the light-detecting element 112. In a group of adjacent light-detecting elements 112 within the image sensor 110, there may thus be one light-detecting element 112 associated with each of the emitted wavelengths. Such a group may thus form a "macro-pixel" and the macro-pixels may be repeated on the image sensor 110 so as to allow acquiring two-dimensional images for each of the wavelengths. A resolution of each such image for a wavelength range will thus correspond to the number of macro-pixels on the image sensor 110.

If the interference patterns are to be acquired simultaneously, a resolution of the acquired interference patterns will hence be decreased. However, in certain applications, such impairment of acquiring of the interference pattern may be acceptable. Further, if the object 108 is moving or changing, this may at best cause blur in reconstruction of an image of the object based on sequential illumination. Thus, for a moving object 108, simultaneous illumination with different wavelengths may be desired.

As mentioned above, the apparatus 100 may provide a fixed relation of the light sources 102, 104, 106, the object 108 and the image sensor 110. The light sources 102, 104, 106 may be separately manufactured and mounted in assigned positions in the housing 114. This implies that the apparatus 100 may use a package for each of the light sources 102, 104, 106 which may be manufactured in large scale and hence may be inexpensive. Such conventional packages may then be mounted in assigned positions in the apparatus 100.

For instance, the light sources 102, 104, 106 may be provided as a small packaged source, such as a transistor outline metal can package providing a small packaged laser diode source.

The light sources 102, 104, 106 may alternatively be provided in a joint package, which may be mounted in the housing 114. The light sources 102, 104, 106 may thus be manufactured in a first step providing a fixed relation between the light sources 102, 104, 106, which may then be easily mounted in a later step of manufacturing the apparatus 100. Laser diodes may suitably be arranged on a common substrate for providing a joint package of the light sources 102, 104, 106.

According to an embodiment, the light sources 102, 104, 106 may include lightguides for guiding generated light to be emitted towards the object 108 from a desired position in the apparatus 100.

The lightguides may be separately arranged from a part of the light source 102, 104, 106 generating light. Thus, the generated light may be coupled into the lightguide in order for light to be guided to a desired position (in which the light generating part may not be easily placed) for providing output of light from the light source 102, 104, 106 in a desired position. However, the coupling of light into the lightguide may be lossy and may need exact alignment, when laser light is to be coupled into the lightguide.

In an embodiment, a plurality of lightguides, one for each light source 102, 104, 106 may be formed in a common substrate. For instance, the lightguides may be formed by means of semiconductor processing so as to allow accurate forming of the lightguides, which may also facilitate coupling of light into the lightguides. The arrangement of lightguides on a common substrate may allow accurate control of the relationship between output positions of the light sources 102, 104, 106 as well.

In a further embodiment, the light sources 102, 104, 106 may be integrated in a photonic integrated circuit such that light generating parts may be arranged in the circuit and lightguides may further be formed in the circuit for guiding light to be output in a desired position from the photonic integrated circuit. Thus, semiconductor laser diodes may be integrated in the photonic integrated circuit and light emitted by the laser diodes may be directly coupled into lightguides for guiding light. This implies that the light sources 102, 104, 106 may be formed in a common package while allowing a large degree of freedom in designing relative arrangement of output of light from the light sources 102, 104, 106 by means of designing paths of the lightguides in the common substrate.

The apparatus 100 may further include a processing unit 118 which may be configured to process the acquired interference patterns in order to form a reconstructed image of the object. The processing unit 118 may be arranged in the housing 114 of the apparatus 100 and may be directly connected to the image sensor 110 for receiving the acquired interference patterns. However, the processing unit 118 may alternatively be arranged in another housing and may be arranged to communicate with the image sensor 110 through a wired or wireless connection.

According to another embodiment, the apparatus 100 may be arranged to transmit the acquired interference patterns to an external unit. The acquired interference patterns may for instance be transmitted via a computer network, such as the Internet, to an external unit arranged remotely from the apparatus 100. The external unit may then be especially adapted to process the acquired interference patterns and reconstruct an image of the object 108. Such use of the external unit may allow the specialized external unit to always be adapted to using best-known algorithms for forming the reconstructed image.

The processing unit 118 may be implemented as software being executed on a general-purpose computer, as firmware arranged, for example, in an embedded system, or as a specifically designed processing unit, such as an Application-Specific Integrated Circuit (ASIC) or a Field-Programmable Gate Array (FPGA).

The processing unit 118 may utilize information of positions of the light sources 102, 104, 106 in relation to the object 108 and the image sensor 110 and information of wavelengths emitted by the light sources 102, 104, 106. Upon manufacture of the apparatus 100, an initial calibration may be performed to determine exact positions and wavelengths so as to account for, for example, any imprecision in mounting. The calibration may thus be performed once and, since the relations of the light sources 102, 104, 106, the object 108, and the image sensor 110 are fixed in the apparatus 100, the initial calibration applies to future holographic imaging performed with the apparatus 100.

Calibration results may be stored as a file available to the processing unit 118 or may be integrated into a specially adapted reconstruction algorithm run by the processing unit 118.

Figure 4:
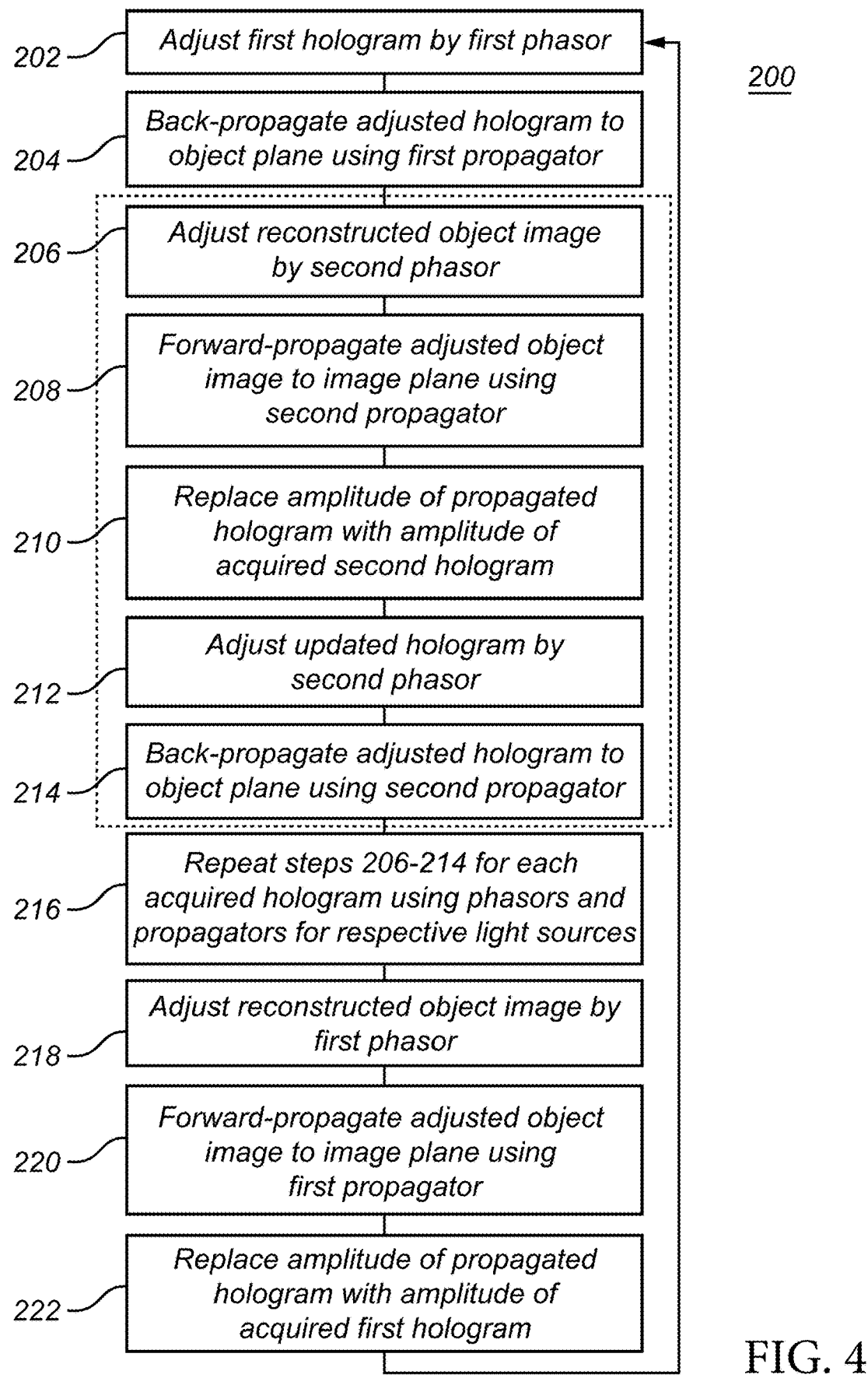
FIG. 4 is a flow chart of an iteration of a phase retrieval algorithm.

Referring now to FIG. 4, an iterative phase retrieval algorithm 200 will be explained. An iteration cycle is illustrated in FIG. 4. The iteration cycle may start with one of the interference patterns, hereinafter called a hologram. Thus, a first hologram acquired with illumination by the first light source 102 may be used as an initial guess.

In step 202, the first hologram is adjusted by a first phasor for the angular position of the first light source 102. A phasor is a complex phase function representing the angular position of the source.

In step 204, the adjusted hologram is then back-propagated to the object plane using a first propagator. A propagator is a wave-propagation algorithm for estimating an electro-magnetic field in one plane with respect to an initial plane. The propagator may be an angular spectrum propagator, for example using a Gerchberg-Saxton algorithm. The propagator uses an angular position of the source and the wavelength of the source.

By means of the back-propagation in step 204, a reconstructed object image is formed. In step 206, the reconstructed object image is adjusted by a second phasor for an angular position of the second source. Then, in step 208, the adjusted object image is forward-propagated to the image plane using a second propagator.

Now, a propagated hologram is formed, which may be compared to the acquired second hologram. In step 210, an amplitude of the propagated hologram is replaced with the amplitude of the acquired second hologram, while phase information of the propagated hologram is maintained.

In step 212, the updated hologram may now be adjusted by the second phasor for the angular position of the second source. Then, in step 214, the adjusted hologram is back-propagated to the object plane using the second propagator, such that a reconstructed object image is again formed.

Steps 206-214 may now be repeated for each of the acquired holograms using the respective phasor and propagator for the light sources with which the holograms were acquired, as illustrated by step 216. The reconstructed object image based on back-propagation using the last propagator may then be adjusted again by the first phasor, see step 218. The adjusted object image is then forward-propagated to the image plane using the first propagator, see step 220.

An amplitude of the propagated hologram using the first propagator is replaced with the amplitude of the acquired first hologram, while phase information of the propagated hologram is maintained, see step 222. This updated hologram may then be used as an updated guess in another iteration of the phase retrieval and the iteration may thus be re-started from step 202.

By performing a number of iterations of the iterative phase retrieval algorithm, the twin image noise may be removed such that a reconstructed image of high quality may be formed.

A metric may be defined for checking an improvement of image quality in every iteration of the algorithm. A user may choose a threshold indicating a minimum level of improvement with respect to a previous iteration. Alternatively, a default or preset threshold may be used. If the metric reveals that the minimum level of improvement is not achieved in an iteration, it may be decided that an acceptable quality (in relation to required processing operations) of the reconstructed image has been achieved. Then, the iterative algorithm may be terminated and a reconstructed image may be returned.

Figure 5A:
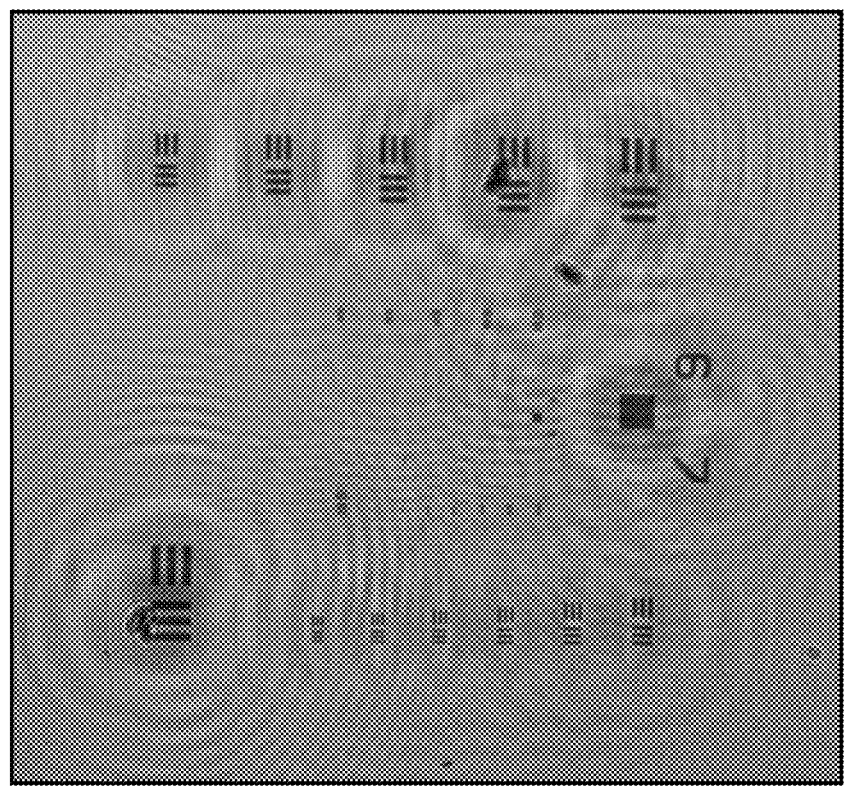
FIG. 5A is an example reconstructed image of an object before processing by the phase retrieval algorithm.
Figure 5B:
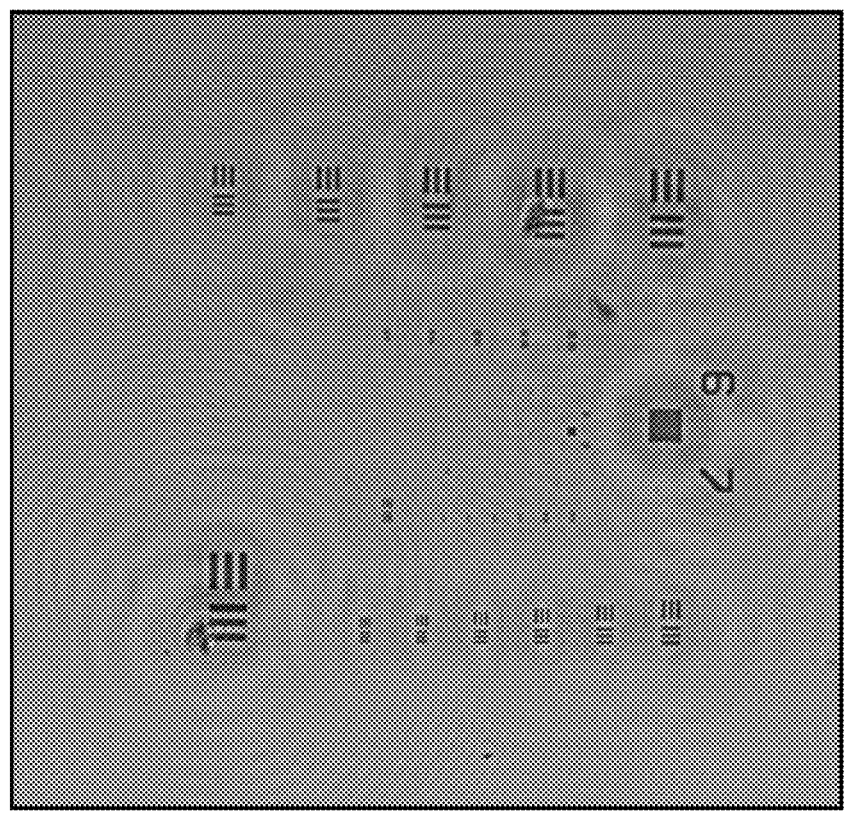
FIG. 5B is an example reconstructed image of an object after one iteration of processing by the phase retrieval algorithm.

In FIGS. 5A and 5B, object images are shown for illustrating enhancement of the image quality using the iterative phase retrieval algorithm based on interference patterns acquired using different angles and wavelengths. Three images of interference patterns were obtained using three different sources illuminating the object with laser wavelengths of 635 nm at an azimuthal angle of −3.5°, 650 nm at an azimuthal angle of 0° and 680 nm at an azimuthal angle of +3.5°, respectively. The polar angle was 0° for all light sources. The light sources were arranged at 6 mm distance from each other in a plane parallel to the object plane and the image plane.

In FIG. 5A, a reconstructed image based on the first interference pattern is shown. Then, a single iteration of the phase retrieval algorithm is performed using the three interference patterns and the reconstructed image shown in FIG. 5B is formed. As is clear from FIGS. 5A and 5B, the twin image noise is significantly reduced in FIG. 5B.

Figure 6:
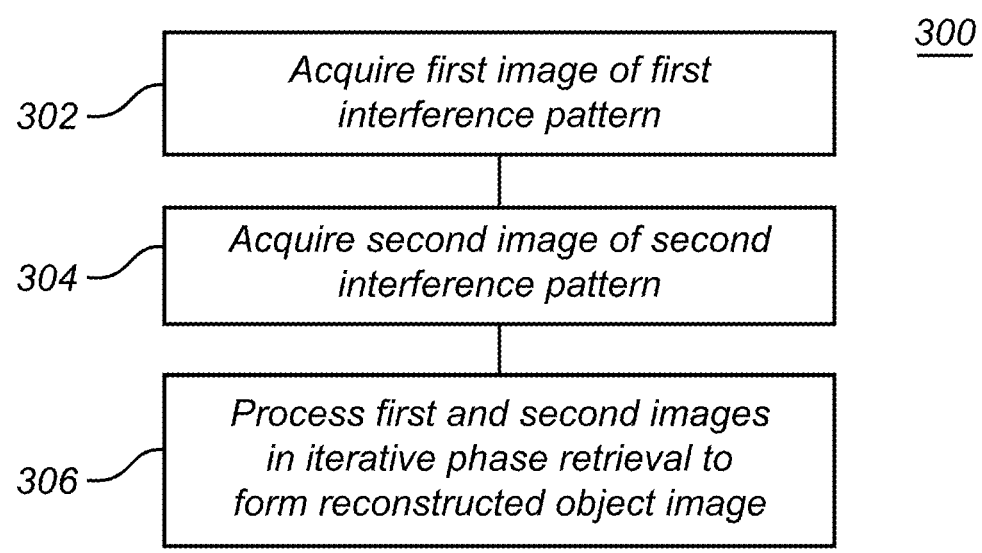
FIG. 6 is a flow chart of a method according to an embodiment.

Referring now to FIG. 6, a method 300 for in-line holographic imaging will be summarized.

The method 300 includes, in a step 302, acquiring a first image of a first interference pattern formed when illuminating an object 108 by a light beam from a first light source 102. The method further includes, in a step 304, acquiring a second image of a second interference pattern formed when illuminating the object 108 by a light beam from a second light source 104. As described above, the first and second image may be simultaneously acquired based on different spectral filters of the image sensor 110 or may be sequentially acquired by the object 108 being sequentially illuminated by the light beams of the first and second light sources 102, 104.

The method further includes, in a step 306, processing the first and second images to perform iterative phase retrieval in order to form a reconstructed image of the object with an estimation of phase information.

In the above the disclosed technology has mainly been described with reference to a limited number of examples. However, as is readily appreciated by a person skilled in the art, other examples than the ones disclosed above are equally possible within the scope of the disclosed technology and the appended claims.

What is claimed is:

1. An apparatus for in-line holographic imaging, the apparatus comprising:
at least a first light source and a second light source arranged for illuminating an object arranged in the apparatus with a light beam;
an image sensor comprising a set of light-detecting elements for acquiring an image based on incident light on the set of light-detecting elements, wherein the image sensor is arranged to detect at least a first and a second interference pattern, wherein the first interference pattern is formed when the object is illuminated by the first light source and the second interference pattern is formed when the object is illuminated by the second light source, wherein the first and second interference patterns are formed by diffracted light, being scattered by the object, and undiffracted light of the light beam, and wherein the at least first and second light sources are arranged at different angles in relation to the object, wherein the first and second light sources are mounted to have a fixed relation to the object and the image sensor, and wherein the first and second light sources are arranged to illuminate the object with different wavelengths; and
a processing unit configured to process the detected first and second interference patterns acquired using illumination of different wavelengths by execution of an iterative phase recovery algorithm so as to form a reconstructed image of the object.

2. The apparatus according to claim 1, wherein the at least first and second light sources are arranged at different azimuthal angle and polar angle with respect to a center of the object.

3. The apparatus according to claim 1, wherein the first and second light sources are arranged in fixed relation to the object and the image sensor such that the angles of the first and second light sources in relation to the object differ to such an extent that the second interference pattern is shifted at least a distance corresponding to a size of a light-detecting element of the image sensor in relation to the first interference pattern.

4. The apparatus according to claim 1, wherein the different wavelengths of the first and the second light sources are chosen in relation to the object to provide an achromatic response of the object.

5. The apparatus according to claim 1, wherein the at least first and second light sources are laser diodes arranged in a conventional package.

6. The apparatus according to claim 1, wherein the at least first and second light sources comprise lightguides formed in a common photonic integrated circuit defining different light outputs for the different light sources.

7. The apparatus according to claim 1, further comprising a receiver arranged to receive a sample holder carrying the object, wherein the receiver defines a position of the object in fixed relation to the at least first and second light sources and the image sensor.

8. A method of in-line holographic imaging, the method comprising:
   acquiring a first image of a first interference pattern, wherein the first interference pattern is formed when an object is illuminated by a light beam of a first light source, wherein the first interference pattern is formed by diffracted light, being scattered by the object, and undiffracted light of the light beam;
   acquiring a second image of a second interference pattern, wherein the second interference pattern is formed when the object is illuminated by a light beam of a second light source, wherein the second interference pattern is formed by diffracted light, being scattered by the object, and undiffracted light of the light beam, wherein the second light source is arranged at a different angle to the object than the first light source, wherein the first and the second light sources have a fixed relation to the object and an image sensor for acquiring the first and the second images, and wherein the first image and the second image are acquired using illumination of different wavelengths;
   processing the first image and the second image acquired using illumination of different wavelengths to perform iterative phase retrieval using information of the relation between the first and second light source to the object, wherein the processing forms a reconstructed image of the object with an estimation of phase information.

9. The method according to claim 8, wherein an iteration of the iterative phase retrieval comprises calculating back-propagation of a light wave from an image plane to an object plane using characteristics of the first light source to form a first reconstructed image of the object and, based on the first reconstructed image, calculating forward-propagation of a light wave from the object plane to the image plane using characteristics of the second light source.

10. The method according to claim 8, wherein the iterative phase retrieval is performed using information obtained during an initial system calibration.

11. The method according to claim 8, wherein the first image and the second image are acquired simultaneously.

12. The method according to claim 8, wherein the at least first and second light sources are arranged at different azimuthal angle and polar angle with respect to a center of the object.

13. The method according to claim 8, wherein the first and second light sources are arranged in fixed relation to the object and the image sensor such that the angles of the first and second light sources in relation to the object differ to such an extent that the second interference pattern is shifted at least a distance corresponding to a size of a light-detecting element of the image sensor in relation to the first interference pattern.

14. The method according to claim 8, wherein the different wavelengths of the first and the second light sources are chosen in relation to the object to provide an achromatic response of the object.

15. The method according to claim 8, wherein the at least first and second light sources are laser diodes arranged in a conventional package.

16. The method according to claim 8, wherein the at least first and second light sources comprise lightguides formed in a common photonic integrated circuit defining different light outputs for the different light sources.

17. The method according to claim 8, further comprising positioning the object in a fixed relation to the at least first and second light sources and the image sensor so as to receive light from a sample holder carrying the object.

* * * * *